United States Patent Office 2,934,497
Patented Apr. 26, 1960

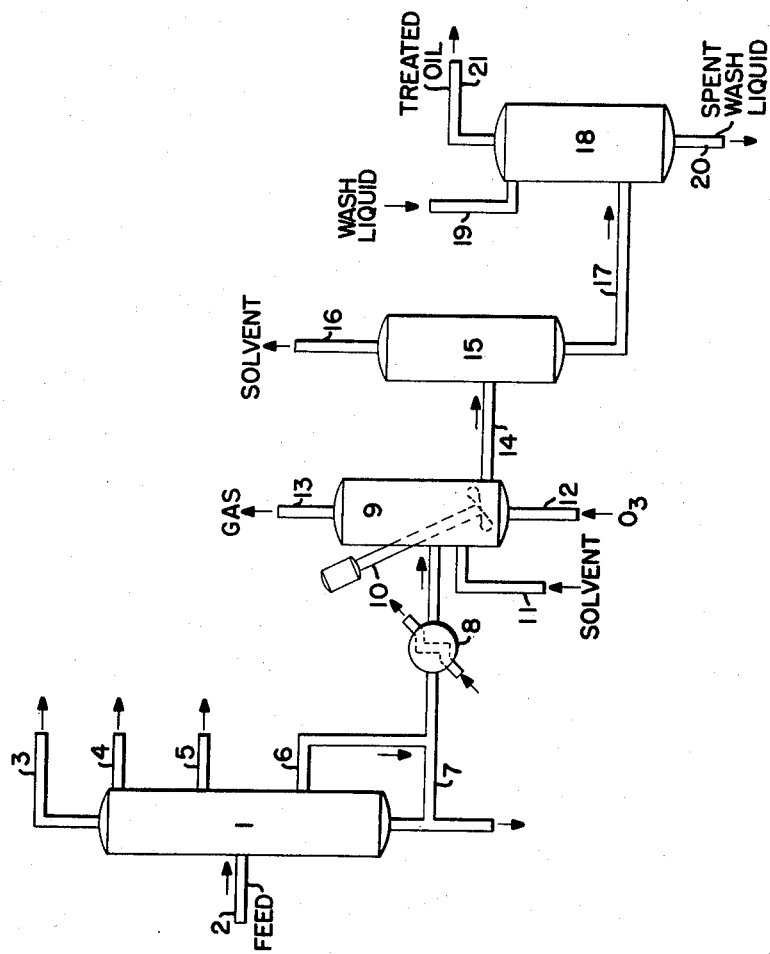

2,934,497

PROCESS FOR THE REMOVAL OF PORPHYRIN METALLIC CONTAMINANTS USING OZONE

Herman Bieber, Linden, and Harry M. Hartzband, Westfield, N.J., assignors to Esso Research and Engineering Company, a corporation of Delaware Application December 2, 1957, Serial No. 700,191

9 Claims. (Cl. 208—251)

The present invention relates to the removal of metallic contaminants from hydrocarbon oils and more particularly relates to an improved process for the separation of metallic contaminants of the porphyrin type from high boiling petroleum fractions.

The problems stemming from the presence of iron, nickel, vanadium and other innate metallic contaminants in petroleum fractions boiling in excess of about 950° F. are not new. It has long been recognized that such contaminants are to a large extent responsible for the degradation of catalysts in conversion processes to which high-boiling fractions are subjected and that they have a detrimental effect upon combustion equipment in which such fractions are used as fuels. In catalytic cracking processes, for example, the presence of very small amounts of such contaminants in the feed stock leads to the rapid deactivation of the catalyst and causes a significant increase in the coke and gases produced. Similar effects are experienced in hydrotreating and related processes. When present in heavy fuel oils, metallic contaminants attack the refractories used to line boilers and combustion chambers; cause clogging and deposit formation on boiler tubes, combustion chamber walls and gas turbine blades; and severely corrode metallic surfaces with which they come into contact at high temperatures.

Earlier research into the nature of these contaminants and possible methods of removing them has shown that they are complex organic chelate compounds of the porphyrin type and that they occur in two forms, one volatile at temperatures between about 1050° F. and about 1250° F. and the other substantially nonvolatile at such temperatures. It is believed that the volatile contaminants are monomeric porphyrins and that the nonvolatile compounds are formed by the polymerization of two or more of these monomers. Because of entrainment during the fractionation of crude oils, contaminants of both types may be present in distillate petroleum fractions boiling as low as 950° F. or, in case of very inefficient distillation, even lower. It has been found that the contaminants are largely unaffected by chemical treatment, solvent extraction and other methods heretofore proposed for their removal and therefore it has generally been the practice to limit the feed stocks to catalytic conversion processes to those fractions having low contaminants contents and to avoid wherever possible the use of fractions containing the contaminants in high concentrations as fuels.

The concentration of metallic contaminants in crude oils and the ratio of volatile to nonvolatile contaminants in such oils may vary considerably. The metals content of any distillate fraction will therefore depend upon the type and concentration of contaminants in the crude from which the fraction was distilled, the boiling range of the fraction, and the amount of entrainment which took place during the distillation. Heavy gas oils distilled from typical crudes may contain from about 1 to about 20 pounds of metallic contaminants per 1000 barrels. Residual fractions and gas oils derived from crudes which are particularly high in contaminants may contain as much as 200 pounds of the metals per 1000 barrels.

The present invention provides a new and improved process for removing innate metallic contaminants from petroleum fractions boiling above about 950° F. whereby such contaminants are first converted into inorganic metallic compounds and thereafter separated from the oil with relative ease. It has been found that mild oxidation of oils containing the contaminants, carried out in the presence of a suitable solvent, results in the breakdown of the cyclic porphyrin molecules into simple inorganic compounds which are water-soluble and can be readily separated from the oil by water washing or a similar procedure. The oxidation proceeds selectively and as a result high metals removal is achieved with little loss in the yield of oil.

The oxidizing agent employed in the process of the invention is ozone and it is used in amounts of about 0.1 to about 1.5% by weight, based upon the weight of the oil to be treated. It has been found that greater amounts of ozone cause degradation of the oil itself, thus increasing yield losses and necessitating expensive and time-consuming after-treatment of the oil before it can be used in the normal manner. The ozone employed in the process is normally obtained by passing a stream of air or oxygen through an electrostatic ozone generator, although ozone derived from other sources may also be used. The gas stream from such a generator normally contains from about 0.1 to 2% ozone, depending upon whether air or oxygen is used and depending upon the conditions under which the generator is operated. Such a gas stream will, of course, also contain oxygen or oxygen and nitrogen. Nitrogen in the gas stream has little or no effect upon the oil under the conditions employed, but some of the oxygen therein may also react with porphyrins selectively, perhaps being catalyzed by the presence of the ozone. Conventional air or oxygen blowing, however, is not selective for porphyrin destruction and severly degrades the oil. The volume of gas employed depends, of course, upon the concentration of ozone therein.

The oxidation of metallic contaminants in accordance with the invention is carried out in the presence of a solvent with which the oil is miscible. It has been found that the use of such a solvent results in selective oxidation of the metallic contaminants and that in the absence of a solvent the ozone appears to react with the constituents of the oil indiscriminately, resulting in high yield losses without significant reduction of the metals content of the oil. Suitable solvents include light hydrocarbon solvents such as pentane, hexane and heptane; low molecular weight halogenated hydrocarbons such as carbon tetrachloride, ethyl chloride and propylene dichloride; and glacial acetic acid. The nature of the solvent employed, whether polar or non-polar, appears to have some effect upon the course of the ozone reaction with respect to hydrocarbons. Polar solvents such as glacial acetic acid appear to favor the formation of low molecular weight monomeric ozonides; whereas non-polar solvents such as hexane tend to result in the formation of polymeric ozonides which are insoluble and may be readily removed from the oil by filtration, centrifugation or settling. As a result, the demetallized oil obtained when using a polar solvent is generally more unstable than that obtained with a nonpolar solvent. This disadvantage is largely offset in the case of glacial acetic acid, however, by the high solubility of the acid for ozone, resulting in better contact between the ozone and the oil; the solvent action of the acid for oxygenated end products formed in the reaction; and the tendency of the acid to decompose ozonides which may be formed before explosive concentrations can be built up. Hexane and glacial acetic acid are therefore preferred solvents for use in accordance with the invention.

In carrying out the process of the invention, the solvent is added to the oil containing metallic contaminants in quantities such that separate oil and solvent phases are not formed. In the case of solvents such as hexane and carbon tetrachloride, the solvent-to-oil ratio may be varied over a considerable range because of the high solubility of the oil in such solvents. Of course, this solubility is dependent upon the type and molecular weight of the hydrocarbons in the oil and will vary somewhat with different fractions. In general such solvents may be used in quantities ranging from about 1% to about 300%, or more, based upon the volume of the oil being treated. High solvent-to-oil ratios have no adverse effect so long as there is no phase separation and have the advantage of lowering the viscosity of the oil and facilitating its handling. When glacial acetic acid is employed as the solvent, however, it has sometimes been found necessary in general to limit the quantity used to from about 1% to about 10%, based upon the volume of the oil, in order to avoid the formation of a separate acid phase. Again the miscibility of the oil and the acid varies to some extent with different oils and thus the maximum amount may vary considerably. It has been found that thus limiting the quantity of solvent employed to that amount which is completely miscible with the oil results in better metals removal with lower yield losses, greatly simplifies the processing steps, and, in the case where glacial acetic acid is used, obviates sludge disposal problems and reduces corrosion.

Treatment of the oil containing metallic contaminants with a solvent and ozone in accordance with the present invention may be carried out at low temperatures ranging from just above the pour point of the oil up to about 150° F. or higher. Frequently the heavy oils in which metallic contaminants are found have relatively high pour points and it is therefore necessary to provide some heat in order to maintain the oil in a completely fluid state. High temperatures increase the reactivity of the ozone but at the same time decrease its half life and therefore are usually undesirable. Moreover, the hydrocarbons in the oil become more reactive at elevated temperatures and there is thus some tendency toward increased yield losses at temperatures significantly above the pour point of the oil. Treatment at ambient temperatures is preferred wherever possible.

Following treatment of the oil with ozone in order to decompose the metallic contaminants therein, the solvent is removed from the oil and the treated oil is washed with water in order to remove the metals therefrom.

In a preferred embodiment of the invention, ozone treatment of the oil is followed by treatment with a dilute mineral acid in lieu of or prior to water washing. Earlier work has shown that nonvolatile metallic porphyrin-type contaminants can be coagulated from high boiling petroleum fractions by treating with an aqueous mineral acid such as dilute hydrochloric, hydrofluoric, hydrobromic, hydroiodic or nitric acid. Such treatment does not effect volatile contaminants in the oil. The concentration of the acid used should be kept sufficiently low to avoid reactions with the oil itself and the formation of acid sludge. In the case of the halogen acids, the concentration should be below about 37% and, in the case of nitric acid, below about 10%. It has now been found that ozone treating followed by washing with such a dilute mineral acid is particularly effective and results in greater metals removal than can be accomplished by either method alone. The effect is more than a mere additive one and is therefore believed synergistic. Other after-treatments, such as mild hydrotreating to stabilize oxygenated products which may be produced by side reactions, clay treating or the like, may also be employed.

The exact nature and objects of the invention may be more fully understood from the following description and the attached drawing which illustrates a preferred embodiment of the invention.

Referring now to the drawing, reference numeral 1 designates a crude oil distillation zone which may constitute, for example, an atmospheric pipe still or a combination of atmospheric and vacuum distillation towers. Crude oil is introduced into distillation zone 1 through line 2 and separated into a number of fractions of different boiling ranges. Light hydrocarbon gases in the $C_1$ to $C_4$ range, methane, ethane, ethylene and the like, may be taken off through an overhead line 3. Naphtha may be withdrawn as an upper side stream through line 4 and middle distillates such as kerosene and light gas oil may be taken off through line 5. These middle distillates have boiling ranges extending up to about 900° F. and will be substantially free of metallic contaminants. A heavy gas oil fraction boiling in the range of from about 950° F. to about 1300° F. is withdrawn from the lower portion of the distillation zone through line 6 and a residual fraction boiling above about 1300° F. is recovered through line 7. Both of these two latter streams will normally contain substantial quantities of metallic contaminants. These streams may be combined and processed for the removal of metallic contaminants in accordance with the invention or may be treated separately, depending upon the end use to which the oil is to be put. Because of the high viscosity of the residual fraction at the treating temperatures employed, it will generally be preferred to treat the two together.

The oil containing metallic contaminants withdrawn from distillation zone 1 through lines 6 and 7, after cooling in a heat exchanger 8 or intermediate storage not shown, is passed into treating zone 9 for the oxidation of metallic contaminants in accordance with the invention. The treating zone may comprise a closed reaction vessel provided with a suitable agitator 10 and with a jacket, coils or other means, not shown, for maintaining the temperature within the treating zone at the desired level. Solvent, for example about 10% by volume, based upon the oil, of glacial acetic acid, is introduced into treating zone 9 through line 11 and a stream of air or oxygen containing from about 0.1 to about 1.5% by weight of ozone is passed through line 12 into the bottom of the treating zone. A sparge or other distribution device is preferably provided in the bottom of the treating zone to assure good contact between the ozone and the oil. Under these conditions, the ozone reacts with the contaminants in the oil, breaking the porphyrin molecule and forming metal oxides. In the presence of glacial acetic acid, these oxides are largely converted to metal acetates. The air or oxygen stream, free of ozone, is removed overhead from the treating zone through line 13. If air, this stream may be vented to the atmosphere or, if oxygen, it may be compressed and employed for the production of more ozone. The treated oil and solvent, together with the metallic compounds suspended therein, are withdrawn from the treating zone through line 14.

The oil and solvent from treating zone 9 are passed to separation zone 15 where the solvent, being relatively volatile in comparison to the oil, is flashed off and removed overhead through line 16. The solvent thus recovered is substantially free of oxidized materials and may be reused without extensive purification. Temperatures of about 300° F. are generally utilized for the separation of the solvent and oil when glacial acetic acid is employed but lower temperatures are satisfactory when using lower boiling solvents. The oil containing dissolved simple metal compounds is then withdrawn from the separation zone and passed through line 17 to washing zone 18. The oil is water-washed or washed with a dilute mineral acid, preferably hydrochloric acid having a concentration below about 37%, introduced through line 19 and the metals and water or acid are removed by means of line 20. The product oil having a substantially decreased metals content is recovered from line 21.

In lieu of the solvent separation and washing shown in the drawing, in some cases it may be preferred, if glacial acetic acid is employed as the solvent, to first separate the solvent and metals from the oil by water washing and thereafter recover the acid from the wash water by fractional distillation. Because of the added distillation expense, however, this procedure is ordinarily not followed.

The metals may be recovered from the wash water by any of a number of methods well known to those skilled in the art.

In order to illustrate the process of the invention still further, reference will be made to exemplary data obtained in a series of experiments carried out in accordance therewith.

EXAMPLE I

A Venezuelan residuum containing about 7.6 parts of nickel per million and about 20.7 parts of vanadium per million was placed in a glass reactor and 10 wt. percent of glacial acetic acid, based upon the oil was added as a solvent. The acid and oil were completely miscible and formed a homogeneous solution. The solution was held at a temperature of about 100° F., just above the pour point of the oil, and ozone generated by passing a stream of pure dry oxygen through a Welsbach ozonator was fed to the reactor at a rate of 0.1 cubic feet per minute through a fritted glass distributor. The ozone content of the gas stream fed to the reactor was about 1%. Analysis of the spent gas from the reactor showed that the ozone was being completely utilized in the reaction. This was continued until 0.17 wt. percent of ozone, based upon the oil, had been reacted. The gas was then stopped and the reaction mixture was removed from the reactor and stripped at 300° F. with nitrogen blowing to remove the glacial acetic acid. The oil remaining was water-washed and then analyzed to determine its metals content. The results were as follows:

| Feed | Metals Content in Feed | | Yield of Treated Oil, percent | Metals Removed, percent | |
|---|---|---|---|---|---|
| | Ni, p.p.m. | V, p.p.m. | | Ni | V |
| Heavy residuum | 7.6 | 20.7 | 97+ | 74 | 75 |

From the above data it can be seen that oxidation with ozone in the presence of 10% of glacial acetic acid resulted in a substantial decrease in the nickel and vanadium content of the oil. The removed metals were accounted for by analysis of the wash water, proving that the porphyrins had been decomposed to yield simple water soluble metal salts. Similar treatment using pure oxygen and treatment with ozone in the absence of a solvent were found to produce essentially no reduction in metals content and to result in sizeable losses of oil due to the formation of hydrocarbon oxidation products. It thus appears that oxidation using ozone in the presence of a solvent as described selectively destroys the nickel and vanadium porphyrins in the oil.

EXAMPLE II

A heavy residuum containing 48 parts of nickel per million and 384 parts of vanadium per million was oxidized in a manner similar to that described above using 0.24 wt. percent of ozone, based upon the oil, and 3 volumes of hexane per volume of oil as the solvent. The hexane completely dissolved the oil without the formation of separate oil and solvent phases. Upon analysis of the treated oil following removal of the solvent and washing of the oil, the following results were obtained.

| Feed | Feed Metals Content | | Yield of Treated Oil | Treated Oil Metals Content | |
|---|---|---|---|---|---|
| | Ni, p.p.m. | V, p.p.m. | | Ni, p.p.m. | V, p.p.m. |
| Heavy residuum | 48 | 384 | 95 | 28 | 268 |

Again it can be seen that oxidation as described effectively converts metallic porphyrins to a form in which they can readily be washed from high boiling oils. Washing without prior oxidation does not remove either nickel or vanadium. The above data thus demonstrate that hexane and similar nonpolar solvents may be effectively employed in the process of the invention.

EXAMPLE III

In order to demonstrate the advantage of following ozone treatment in accordance with the invention by washing with dilute mineral acid rather than water, a virgin gas oil containing 2.6 parts per million of nickel was treated with 0.06 wt. percent ozone, based upon the oil, in the presence of glacial acetic acid as described in Example I. The treated oil, after removal of the acetic acid, was then washed with an equal quantity of 37% aqueous hydrochloric acid and filtered. For comparative purposes, samples of the same feed oil and solvent were, (a) treated with ozone and then water washed, (b) treating with ozone, washed with dilute hydrochloric acid and filtered, and (c) washed and filtered without being subjected to the ozone treatment. The metals content of each sample was then determined. The data obtained are summarized below.

| Sample | Nickel, p.p.m. | Percent Removed | Oil Yield, percent |
|---|---|---|---|
| Virgin gas oil feed | 2.6 | | |
| HCl washed and filtered sample | 1.4 | 46 | 99+ |
| Ozone treated sample | 1.9 | 27 | 92 |
| Ozone treated and acid (HCl) washed and filtered sample | <0.38 | 86 | 92 |

EXAMPLE IV

In another experiment a heavy gas oil containing 3.9 p.p.m. Ni and 25 p.p.m. V was treated in the following different ways: (1) acid washed, (2) ozone treated and water washed, (3) ozone treated and acid washed and (4) ozone treated in the presence of acid. The gas oil used had been very carefully fractionated to avoid entrained metals and contained essentially only volatile metals. The results obtained as shown below are indicative of the effectiveness of the combination of ozone treating and acid washing for metals removal.

Table A

| | Percent Removed | | Oil Yield, Wt. Percent |
|---|---|---|---|
| | Ni | V | |
| 1. Heavy gas oil washed with 18% HCl | Nil | Nil | 99+ |
| 2. Oil from #1 treated with .24 wt. percent $O_3$ in presence of 10 wt. percent glacial acetic acid and water washed | 55 | 35 | 93 |
| 3. Same as #2 but followed by 18% HCl wash | 85 | 73 | 93 |
| 4. Oil treated with .24 wt. percent $O_3$ in the presence of 18% HCl (no acetic acid used) | 28 | 36 | 92 |

These data demonstrate the particular effectiveness of treatment with ozone in the presence of a solvent followed by acid washing. They also show the ineffectiveness of acid washing alone for removing volatile metals.

EXAMPLE V

In another experiment a heavy petroleum residuum was treated with 0.9 wt. percent ozone in the presence of 100 wt. percent acetic acid in a single phase system. The data obtained were as follows:

Table B

|  | Metals Concentration, p.p.m. | | Percent Removal | |
|---|---|---|---|---|
|  | Ni | V | Ni | V |
| 1. Residuum feed | 7.6 | 20.7 |  |  |
| 2. After O₃ treat and water washing to remove acetic acid and metals | 0.6 | 3.6 | 92 | 83 |
| 3. After O₃ treat, HCl washing and filtering | 0.17 | 0.79 | 98 | 96 |
| 4. After HCl washing and filtration of feed (no O₃ used) | 4.7 | 6.4 | 38 | 69 |

The foregoing data show that the combination of ozone treating and washing with a dilute aqueous acid removed from 73–98% of the metals originally present, thereby rendering the oils suitable for use as a feed stock to catalytic conversion processes or as a high grade fuel. Although treatment with dilute mineral acid alone removed some of the nonvolatile contaminants, as shown by Examples III and V, Example IV demonstrates that such treatment has no effect upon the volatile contaminants. In every instance, however, the combination of ozone treating followed by acid washing was highly effective and removed both volatile and nonvolatile contaminants from the oil. The combination process is thus a particularly effective process and is therefore preferred.

It will be understood that a great many modifications can be made in the process described without departing from the scope of the invention and that such modifications will be apparent to those skilled in the art.

What is claimed is:

1. A process for the removal of innate metallic porphyrin contaminants from a petroleum fraction boiling in excess of about 950° F. which comprises dissolving said fraction in a solvent to form a single liquid phase; contacting said liquid phase with from about 0.1 to about 1.5 wt. percent of ozone, based upon the weight of said fraction; separating said fraction and said solvent; and thereafter water-washing said fraction and recovering an oil substantially reduced in metallic contaminants content.

2. A process as defined by claim 1 wherein said solvent is hexane.

3. A process as defined by claim 1 wherein said solvent is glacial acetic acid.

4. A process for the removal of metallic prophyrin contaminants from a petroleum oil boiling above about 950° F. which comprises adding glacial acetic acid to said oil to form a homogeneous solution; passing a gas stream containing from about 0.1 to about 2% ozone through said solution until about 0.1 to about 1.5% ozone, based upon the weight of the oil, has been reacted with said oil; separating said acid from said oil; water washing said oil; and recovering said oil substantially reduced in metallic contaminants content.

5. A process as defined by claim 4 wherein said solution is contacted with said ozone at a temperature ranging from just above the pour point of the oil up to about 150° F.

6. A process as defined by claim 5 wherein said oil, after being separated from said solvent, is contacted with a dilute mineral acid without the formation of an acid sludge and thereafter separated from said acid and coagulated metallic contaminants.

7. A process as defined by claim 6 wherein said acid is an aqueous hydrochloric acid having a concentration below about 37%.

8. A process for the removal of innate metallic porphyrin contaminants from a petroleum fraction boiling in excess of about 950° F. which comprises dissolving said fraction in about 1 to 3 volumes of hexane; contacting said fraction in hexane solution with about 0.1 to about 1.5 wt. percent, based upon the fraction, of ozone at a temperature above the pour point of the fraction and below about 150° F.; separating said fraction from said hexane; contacting said fraction with a dilute mineral acid without the formation of an acid sludge; separating said fraction from said acid and coagulated metallic contaminants; and thereafter water washing said fraction and recovering an oil substantially reduced in metallic contaminants.

9. A process as defined by claim 8 wherein said mineral acid is aqueous nitric having a concentration below about 10%.

References Cited in the file of this patent

UNITED STATES PATENTS

| 2,546,125 | Howes | Mar. 20, 1951 |
| 2,744,853 | Kavanaugh et al. | May 8, 1956 |
| 2,769,770 | Bicek | Nov. 6, 1956 |
| 2,778,779 | Donaldson | Jan. 22, 1957 |
| 2,832,723 | Jezl | Apr. 29, 1958 |